United States Patent

Hartmann, Jr.

Patent Number: 5,355,728
Date of Patent: Oct. 18, 1994

[54] TIRE BALANCE MEASURING MACHINE FOR VARIOUS TIRE SIZES

[75] Inventor: Richard Hartmann, Jr., Brighton, Mich.

[73] Assignee: Balance Technology, Inc., Ann Arbor, Mich.

[21] Appl. No.: 901,675

[22] Filed: Jun. 22, 1992

[51] Int. Cl.$^5$ ............................................. G01M 1/22
[52] U.S. Cl. ........................................ 73/460; 73/462; 73/471
[58] Field of Search ................. 73/460, 471, 474, 462, 73/459, 484

[56] References Cited

U.S. PATENT DOCUMENTS

| | | | |
|---|---|---|---|
| 2,349,552 | 5/1944 | Holmes | 73/459 |
| 2,380,108 | 7/1945 | Holmes | 73/474 |
| 2,532,056 | 11/1950 | Carrigan | 73/459 |
| 2,559,707 | 7/1951 | Burke et al. | 73/466 |
| 3,036,467 | 5/1962 | McWhorter | 73/459 |
| 3,238,785 | 3/1966 | Lodge et al. | 73/462 |
| 4,191,055 | 3/1980 | Orem et al. | 73/462 |
| 4,262,536 | 4/1981 | Orem et al. | 73/462 |
| 5,103,595 | 4/1992 | Dale et al. | 73/460 |

FOREIGN PATENT DOCUMENTS

570632 4/1957 Italy .
811184 9/1956 United Kingdom .

*Primary Examiner*—Hezron E. Williams
*Assistant Examiner*—Helen C. Kwok
*Attorney, Agent, or Firm*—Krass & Young

[57] ABSTRACT

A balancing station includes a vertical spindle having a collet for frictionally engaging the center hole of a wheel. A motor driven drum is mounted on an arm which is moved by an actuator to urge the drum against the wheel with a radial force so that it can frictionally drive the wheel. An idler drum or a second driven drum mounted on a similar arm on the opposite side of the wheel is moved by an actuator to engage the wheel at a location diametrically opposite the driven drum to apply a radial force to the wheel equal and opposite to the force from the driven drum. The arms are symmetrically mounted with respect to the spindle so that the two drums will contact diametrically opposite locations on the wheel for any size wheel over a large size range.

6 Claims, 2 Drawing Sheets

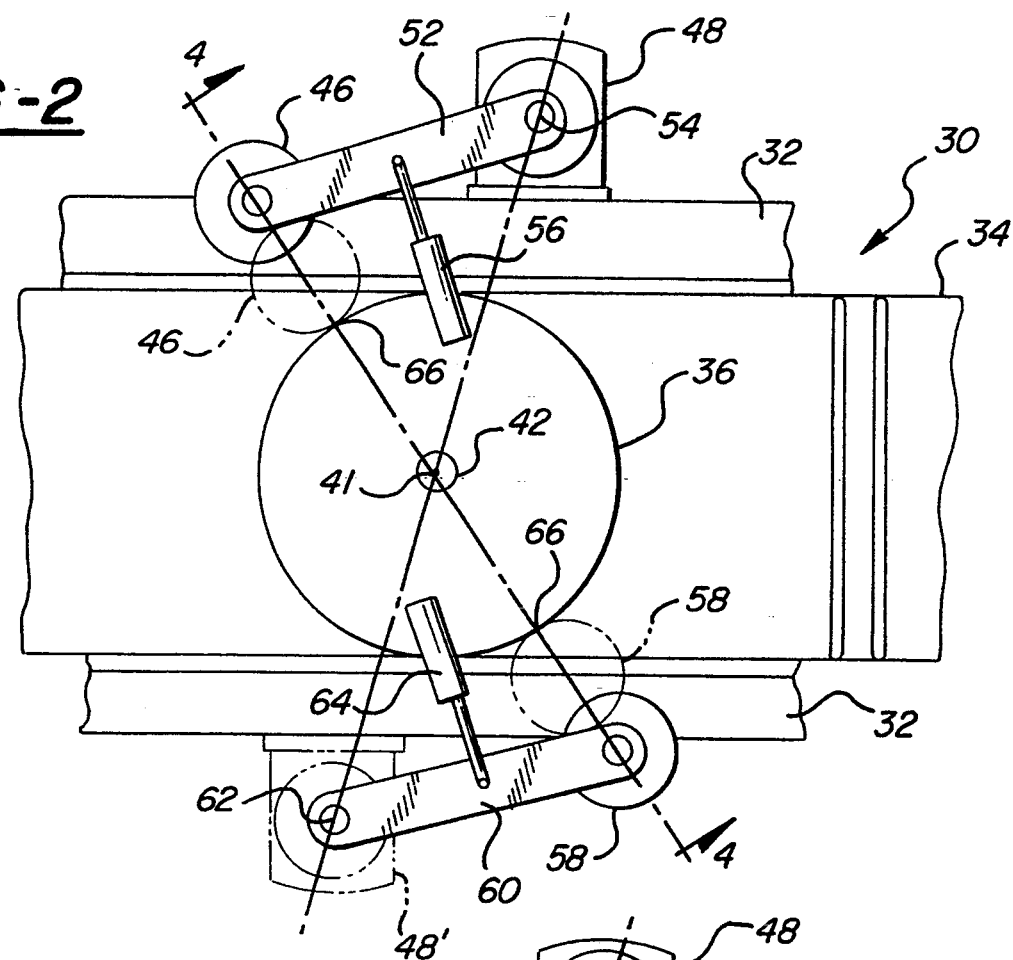
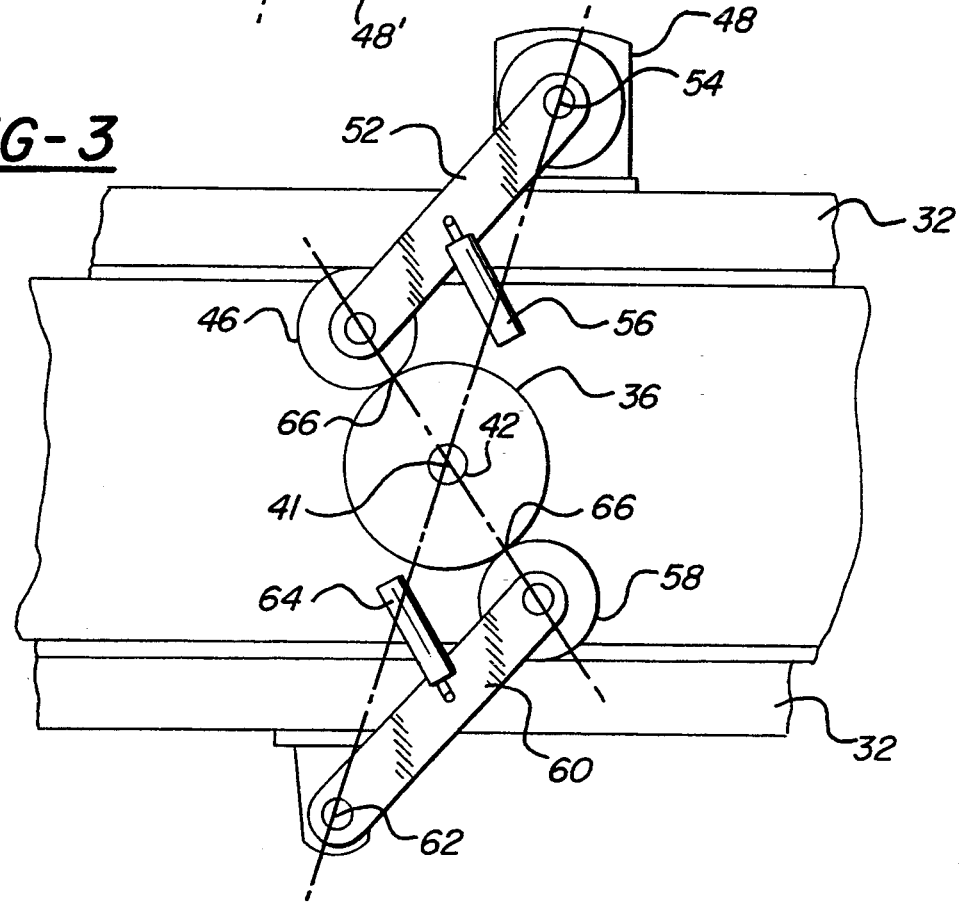

TIRE BALANCE MEASURING MACHINE FOR VARIOUS TIRE SIZES

FIELD OF THE INVENTION

This invention relates to apparatus for measuring the dynamic balance of wheels and tires and particularly to such an apparatus for rotating a wheel to be balanced and for automatically adjusting to accommodate tires of widely varying sizes.

BACKGROUND OF THE INVENTION

In the production of automotive vehicles it is a known practice to assemble tires and wheels at high rates of assembly and then to balance the tires and wheels on an automated machine which also operates at a high rate, say 9 or 10 seconds per tire. Such machines have a station to center a tire/wheel assembly, a balance measuring station, and a marking station where the position and amount of unbalance is marked on the tire, and a transfer mechanism for sequentially moving the wheel assembly (hereinafter called a "wheel") from one station to another.

The balance measuring station typically includes a rotatable spindle having an air pressure operated collet which holds the wheel hub attachment plate or spider at its central opening, a motor driven drum which is pressed against the outer periphery of the tire to spin the wheel, and a vibration sensor for detecting the effect of unbalance. In addition, a balance measuring circuit determines from the detected vibration the amount and position of the unbalance.

It is known, as shown in FIG. 1, to impart rotation to the wheel 10 on the spindle 24 by engaging the tire periphery by a motor driven wheel or drum 12. Typically the drum 12 is mounted on one end of an arm which pivots about the other end for movement of the drum from a home position to an operating position against the tire 14 where it presses radially against the tire with sufficient force F to sustain a transfer of torque from the rotating drum to the tire. That radial force F is transferred by the tire to the wheel rims 18 as forces F' and thence through the hub attachment plate 20 to the spindle 24. Since the rims 18 are spaced from the hub attachment plate 20 which engages the collet 22 on the spindle 24, the force F' on each rim creates a moment about the spindle. Because the wheel usually has its hub attachment plate 20 offset from the mid-plane of the wheel, the forces F' are unequally spaced from the plate 20 and hence the moments are not equal. The differential of the moments creates a net moment M on the wheel which tends to tilt the wheel from its desired attitude which is normal to the axis of the spindle. The air operated collet 22 which frictionally engages the center hole of the attachment plate must overcome the net moment M if the wheel is to be secure on the spindle. Experience with such machines proves that where the net moment is significant, the wheel can overcome the collet force and walk up the collet during tire rotation.

It is also known, as shown in the U.S. Pat. No. 4,191,055 to Orem et al entitled "Dynamic Balance Determining System", to rotate the wheel by two powered rotating drums pressed against the outer tire periphery. There, the drums are located on opposite sides of the conveyor that carries the wheels and are supported by arms pivoted at positions downstream of the drums; that is the pivot points of the arms are both at one side of the wheel in the direction of conveyor movement. As a result, the drums move in arcuate paths between home positions and tire driving positions. For one wheel size the drums will contact the wheel at diametrically opposite points. In that particular case the radial force of each drum against the wheel will offset the force of the other drum and there will be no net moment tending to lift the wheel from the collet. However, for larger or smaller wheels, the contact points of the drums with the wheel will not be at diametrically opposite locations and the radial forces will not offset one another; rather, both drums will contribute to a moment tending to lift the wheel from the collet.

SUMMARY OF THE INVENTION

It is therefore an object of the invention to provide an apparatus in a balancing machine for applying rotating force to the outer periphery of wheels of different sizes without creating a net moment tending to lift the wheel from its desired location in the machine.

The invention is carried out by a wheel balancing machine for wheels of widely different sizes comprising: a spindle having an axis for rotatably supporting a wheel on the axis including a collet for holding the wheel on the spindle; wheel rotating means comprising a motor driven drum for frictionally engaging the outer perimeter of the wheel and means for moving the drum through a defined path between driving and idle positions and for applying a first radial force to the wheel, whereby the driving position of the drum is established by the wheel diameter; and counterforce means movable between an idle position and a wheel engaging position diametrically opposite the driving position of the drum for applying a second radial force to the wheel equal and opposite to the first radial force.

BRIEF DESCRIPTION OF THE DRAWINGS

The above and other advantages of the invention will become more apparent from the following description taken in conjunction with the accompanying drawings wherein like references refer to like parts and wherein:

FIGS. 2 and 3 are plan views of a balancing machine showing driving apparatus for engaging large wheels and small wheels, respectively.

DESCRIPTION OF THE INVENTION

Figure 1:
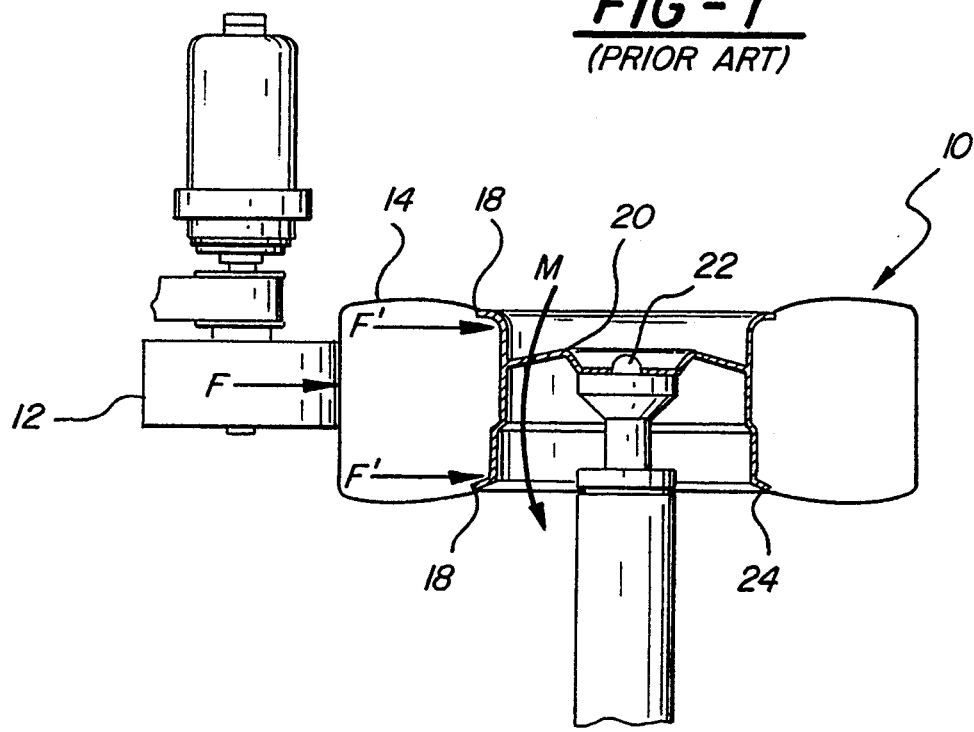
FIG. 1 is an elevational cross section of a spindle-mounted wheel and driving apparatus according to the prior art.
Figure 4:
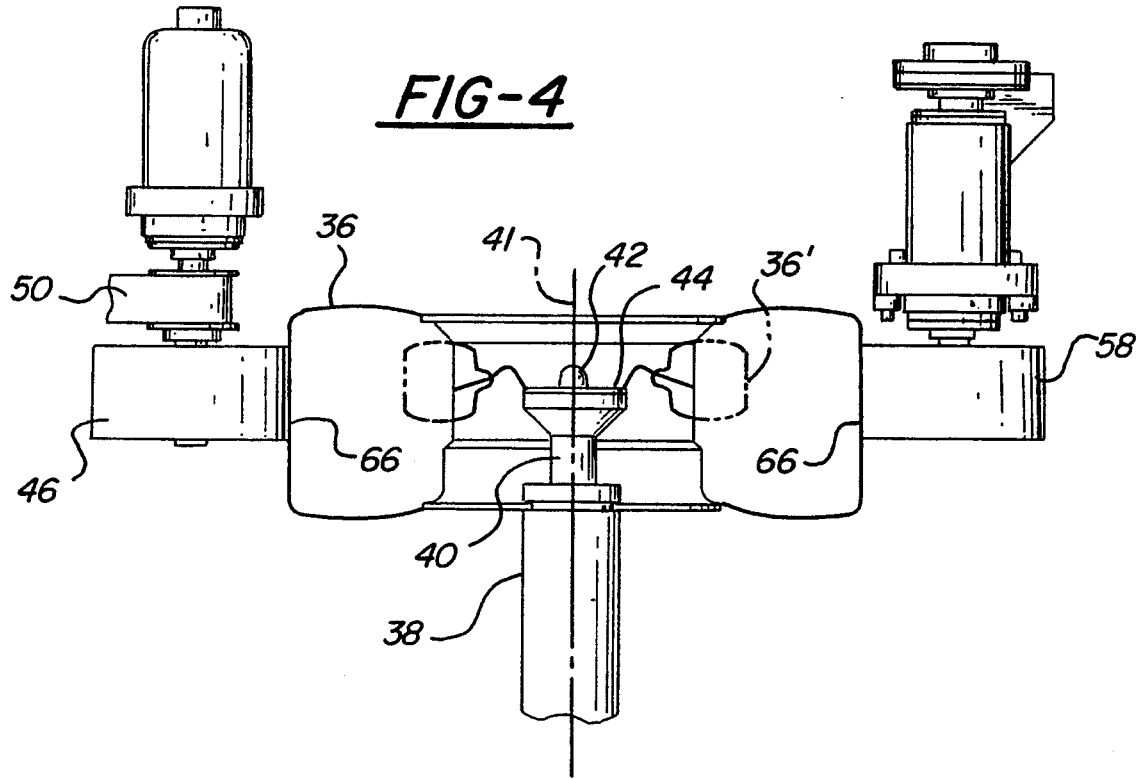
FIG. 4 is a cross section taken along line 4—4 of FIG. 2 with a small tire profile superimposed thereon.

Referring to FIGS. 2, 3 and 4, a balancing machine 30 having lateral frame members 32 incorporates a roller type conveyor 34 for transferring wheels 36 to and from the balance measuring station. At the balance measuring station a spindle housing 38 supports a spindle 40 for rotatably holding a wheel about a vertical spindle axis 41, and an air pressure operated collet 42 at the top of the spindle 40 fits within the center hole of a wheel's hub attachment plate 44 and frictionally engages the plate to hold the wheel during rotation. Balance testing instrumentation (not shown) on the spindle measures vibration due to unbalance in a well known manner.

On one side of the conveyor 34, a powered driving wheel or drum 46 for frictionally driving the wheel is driven by a motor 48 through a belt and pulley arrangement 50. The drum is supported on one end of an arm 52, and the arm 52 is pivotally supported on the frame 32 for movement about a vertical axis 54 which is coincident with the motor rotation axis. An air operated linear actuator 56 is attached to the arm for selectively moving the drum through a defined arcuate path to a home position (solid lines in FIG. 2) to facilitate loading and unloading of wheels, and to wheel-engaging position (broken lines in FIG. 2 and solid lines in FIG. 3) for driving the wheel. The actuator 56 pushes the drum 46 against the tire with enough radial force to enable sufficient friction for torque transfer from the drum to the tire. On the opposite side of the conveyor a counterforce mechanism includes an idler drum 58 having the same size as the drum 46. The drum 58 is rotatably carried at one end of an arm 60 which is pivotally mounted on the frame 32 and for movement about a vertical axis 62. The axes 54 and 62 are aligned with and diametrically opposite the axis of the spindle 40. A linear actuator 64 which is the same as the actuator 56 is attached to the arm 60 and exerts the same force on arm 60 as the actuator 56 exerts on arm 52. The arm 60 is the same length as the arm 52, that is the spacing between the pivot axis and the drum axis is the same on each arm. That insures that the drums engage the tire at contact lines 66 which are diametrically opposite the spindle axis for any size wheel. Optionally, the drum 58, instead of idling, may be powered by a motor 48', as shown in phantom lines, so that the wheel is driven by both drums 46 and 58.

The symmetrical relationship of drive drum and idler drum is shown in FIG. 2 for a large wheel 36 and in FIG. 3 for a small wheel 36'. The large wheel 36 as well as the small wheel 36' enjoys the application of equal and opposite radial forces from driving drum 46 and idler drum 58. This symmetrical arrangement then avoids creating a moment which tilts the wheel about the spindle, even though the spider or hub attachment plate 44 is offset from the midplane of the wheel. FIG. 4 shows the contrast in size between large wheel 36 and small wheel 36'. In practice the wheel sizes accommodated by such a balancing machine vary between 36.3 inch diameter, 17 inch tire width and spider offset of 7.5 inch for a large tire and 21.5 inch diameter and 4.5 inch width and no offset for a small tire.

It will thus be seen that the improvement in balancing machines due to the present invention affords a practical wheel rotation system applicable to a wide range of wheel types and sizes which is free of wheel tilting on the spindle due to imbalanced radial forces.

The embodiments of the invention in which an exclusive property or privilege is claimed are defined as follows:

1. A wheel balancing machine for wheels of various diameters comprising:
    a spindle having an axis for rotatably supporting a wheel on the axis including a collet for holding the wheel on the spindle;
    wheel rotating means comprising a motor driven drum for frictionally engaging the outer perimeter of the wheel and means for moving the drum through a defined path between a driving and idle positions and for applying a first radial force to the wheel, so that the driving position of the drum on the wheel is established by and varies with the wheel diameter; and
    counterforce means operative irrespective of the wheel diameter for applying a second radial force to the wheel substantially equal to the first radial force and at a location on the wheel diametrically opposed to said driving position of the drum on the wheel.

2. The invention as defined in claim 1 wherein:
    said means for moving the drum through a defined path comprises a first arm having one end pivoted at a first pivot axis and another end carrying the drum so that the defined path is arcuate; and
    said counterforce means comprises a second pivot axis aligned with the spindle axis and the first pivot axis, a second arm having one end pivoted at the second pivot axis and a second drum carried by the second arm for movement in a second arcuate path between a idle and wheel engaging positions.

3. The invention as defined in claim 2 including actuator means connected to the arms for moving the drums against opposite sides of the wheel with equal force.

4. The invention as defined in claim 2 wherein the second drum is an idler drum which is rotated by contact with the wheel.

5. A wheel balancing machine for wheels of various diameters comprising:
    a spindle having an axis for rotatably supporting a wheel on the axis including a collet for holding the wheel on the spindle;
    wheel rotating means comprising a first motor driven drum for frictionally engaging the outer perimeter of the wheel and means for moving the first drum through a defined path between a driving and idle positions and for applying a first radial force to the wheel, so that the driving position of the drum on the wheel is established by and varies with the wheel diameter; and
    counterforce means including a second motor driven drum for frictionally engaging the outer perimeter of the wheel and guide means for moving the second drum through a second defined path between an idle position and a wheel engaging position, said guide means being operative irrespective of the wheel diameter to move the second drum into engagement with the wheel at a location diametrically opposite the driving position of the first drum on the wheel for applying a second radial force to the wheel equal and opposite to the first radial force.

6. The invention as defined in claim 5 wherein:
    said means for moving the first drum through a defined path comprises a first arm having one end pivoted at a first pivot axis and another end carrying the first drum so that the defined path is arcuate; and
    said guide means for moving the second drum through a second defined path comprises a second arm having one end pivoted at a second pivot axis and another end carrying the second drum so that the second defined path is arcuate, the second pivot axis being aligned with the spindle axis and the first pivot axis.

* * * * *